United States Patent [19]

Gilland et al.

[11] Patent Number: 4,718,776

[45] Date of Patent: Jan. 12, 1988

[54] PORTABLE MONITORING DEVICE AND METHOD

[75] Inventors: Jerry R. Gilland, Boulder; Christopher L. Sweeney, Denver; Ronald D. Wertz, Boulder, all of Colo.

[73] Assignee: Ball Corporation, Broomfield, Colo.

[21] Appl. No.: 932,446

[22] Filed: Nov. 17, 1986

Related U.S. Application Data

[63] Continuation of Ser. No. 764,658, Aug. 12, 1985, abandoned.

[51] Int. Cl.⁴ .............................................. G01K 7/00
[52] U.S. Cl. ................................. 374/170; 374/208; 374/149; 374/150; 364/557
[58] Field of Search ............... 374/39, 41, 208, 170, 374/149, 150, 106; 174/50, 55, 133 R; 339/182 R, 183; 338/222; 364/557, 580

[56] References Cited

U.S. PATENT DOCUMENTS

| | | | |
|---|---|---|---|
| 4,044,238 | 8/1977 | Emschermann et al. | 364/552 |
| 4,048,852 | 9/1977 | Sakakibara et al. | 374/41 |
| 4,109,527 | 8/1978 | Goode, Jr. | 374/170 |
| 4,198,676 | 4/1980 | Varnum et al. | 374/170 |
| 4,241,971 | 12/1980 | Leonard, Jr. et al. | 339/182 R |
| 4,403,296 | 9/1983 | Prosky | 364/557 |
| 4,455,095 | 6/1984 | Bleiker | 374/39 |
| 4,473,307 | 9/1984 | Dobronyi et al. | 374/39 |
| 4,480,312 | 10/1984 | Wingate | 374/170 |
| 4,518,839 | 5/1985 | Taguchi et al. | 374/149 |
| 4,593,370 | 6/1986 | Balkanli | 364/557 |

FOREIGN PATENT DOCUMENTS

| | | | |
|---|---|---|---|
| 3044262 | 6/1982 | Fed. Rep. of Germany | 374/39 |
| WO82/01589 | 5/1982 | PCT Int'l Appl. | 374/39 |

Primary Examiner—Charles Frankfort
Assistant Examiner—Thomas B. Will

[57] ABSTRACT

A portable monitoring device and method are disclosed for monitoring a predetermined parameter, such as temperature. The portable device, or probe, is miniaturized and includes a sensor and an associated electronic unit encased within a housing. The sensor senses the parameter to be monitored and produces signals indicative thereof, while the electronic unit includes a converter for converting signals received in analog form to digital signals, a memory for storing the digital signals, and a microprocessor for controlling the sensing and signal storing operations. The probe is a self-sufficient unit, is electrically isolated while at the monitoring area, and is caused to operate in an active mode during periods of sensing and storing of information in memory that requires low power with even lower power consumption being achieved when the probe is inactive. A band, electrically insulated from the remainder of the housing, allows readout of information stored in memory within the probe after the probe has been removed from the monitoring area and mounted at a console unit for readout purposes.

23 Claims, 13 Drawing Figures

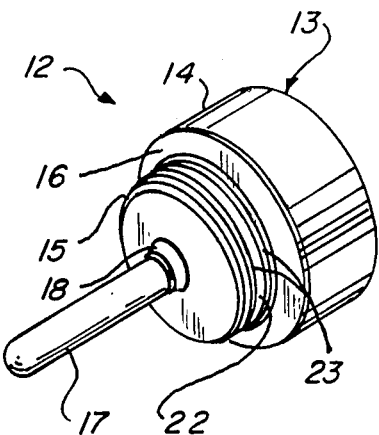
Fig_1
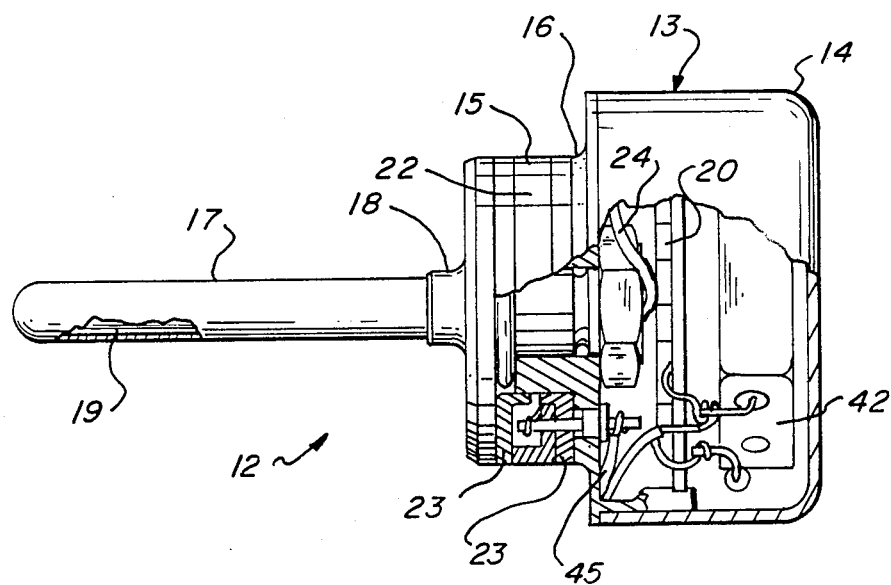
Fig_2

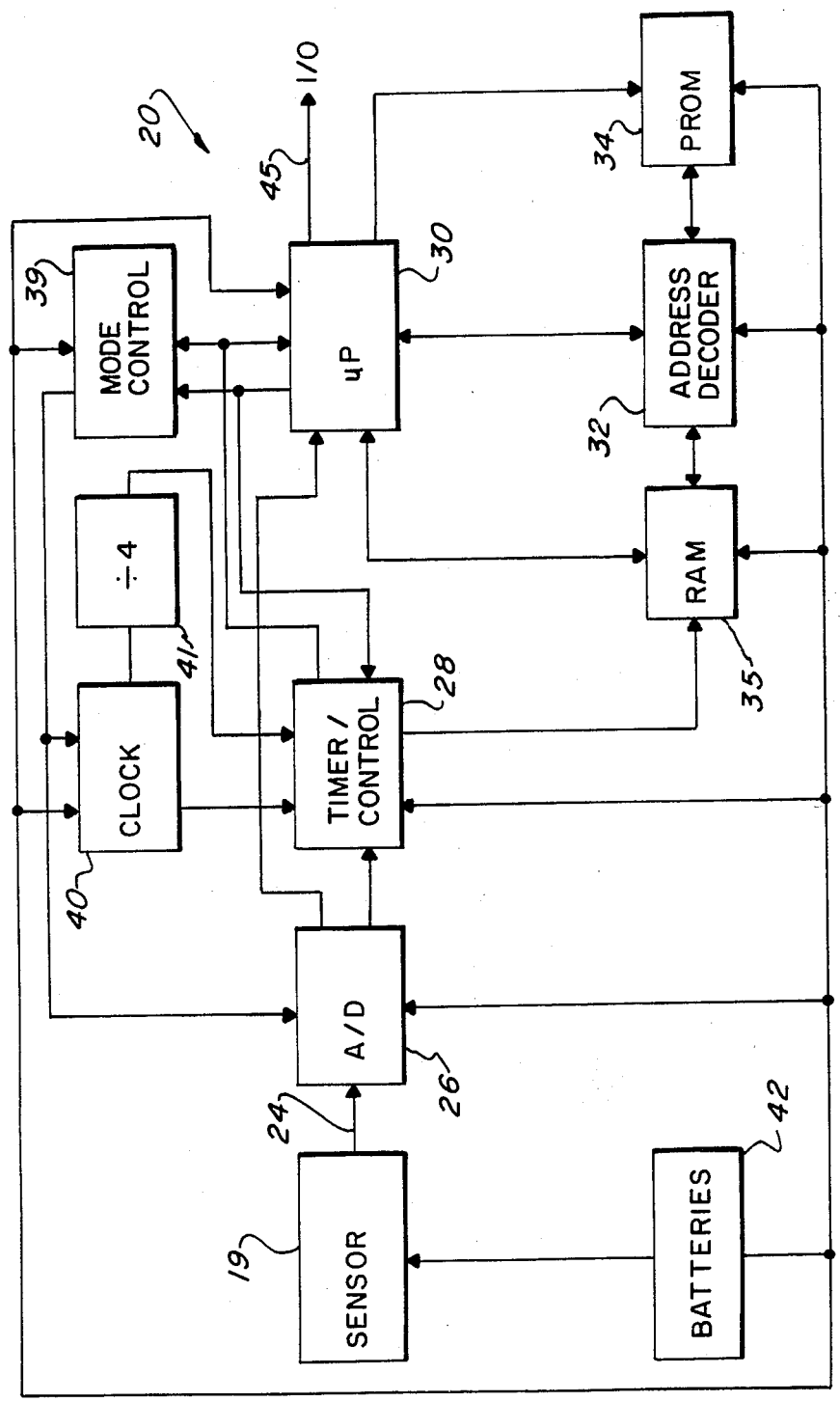
Fig_3

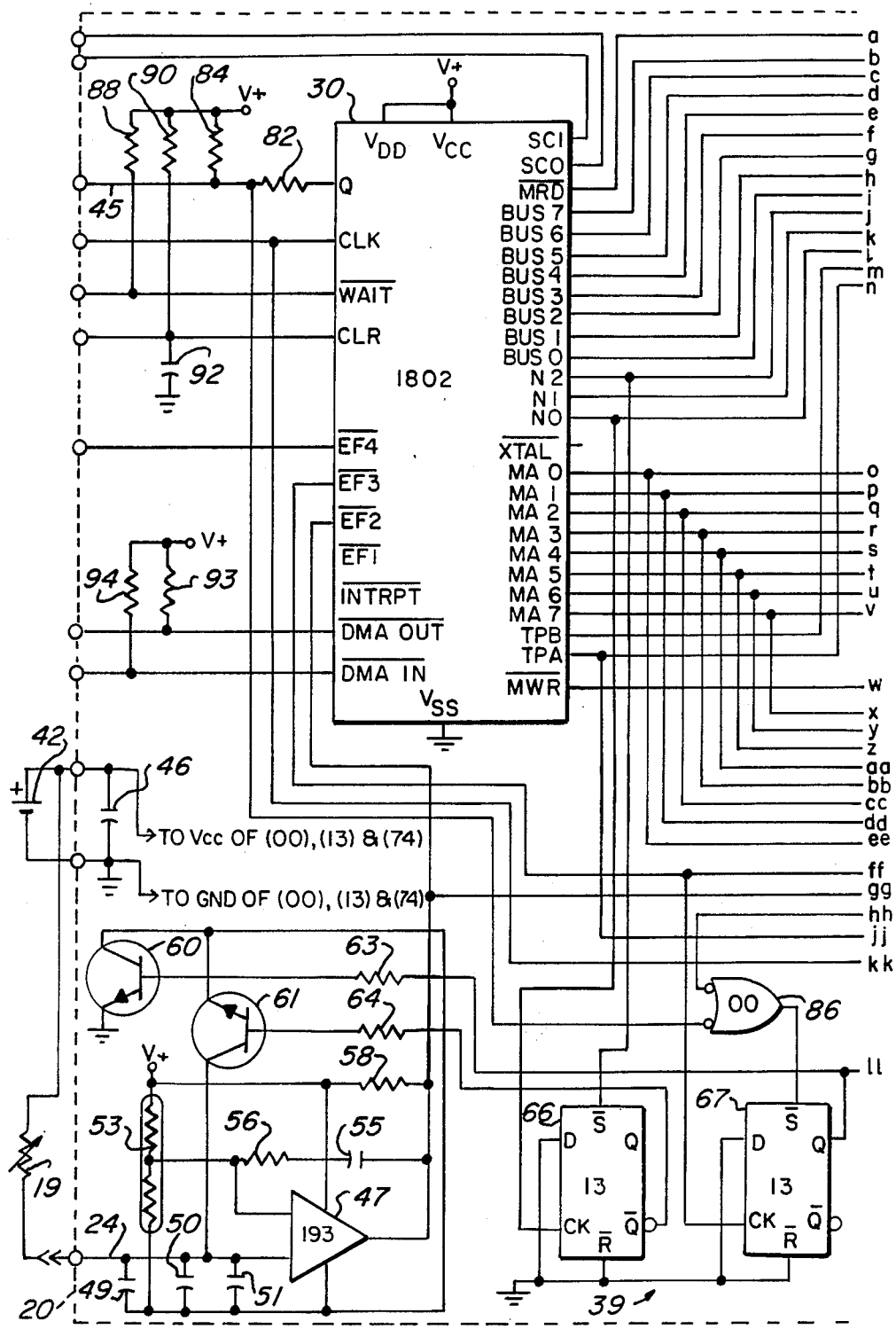
Fig_4A

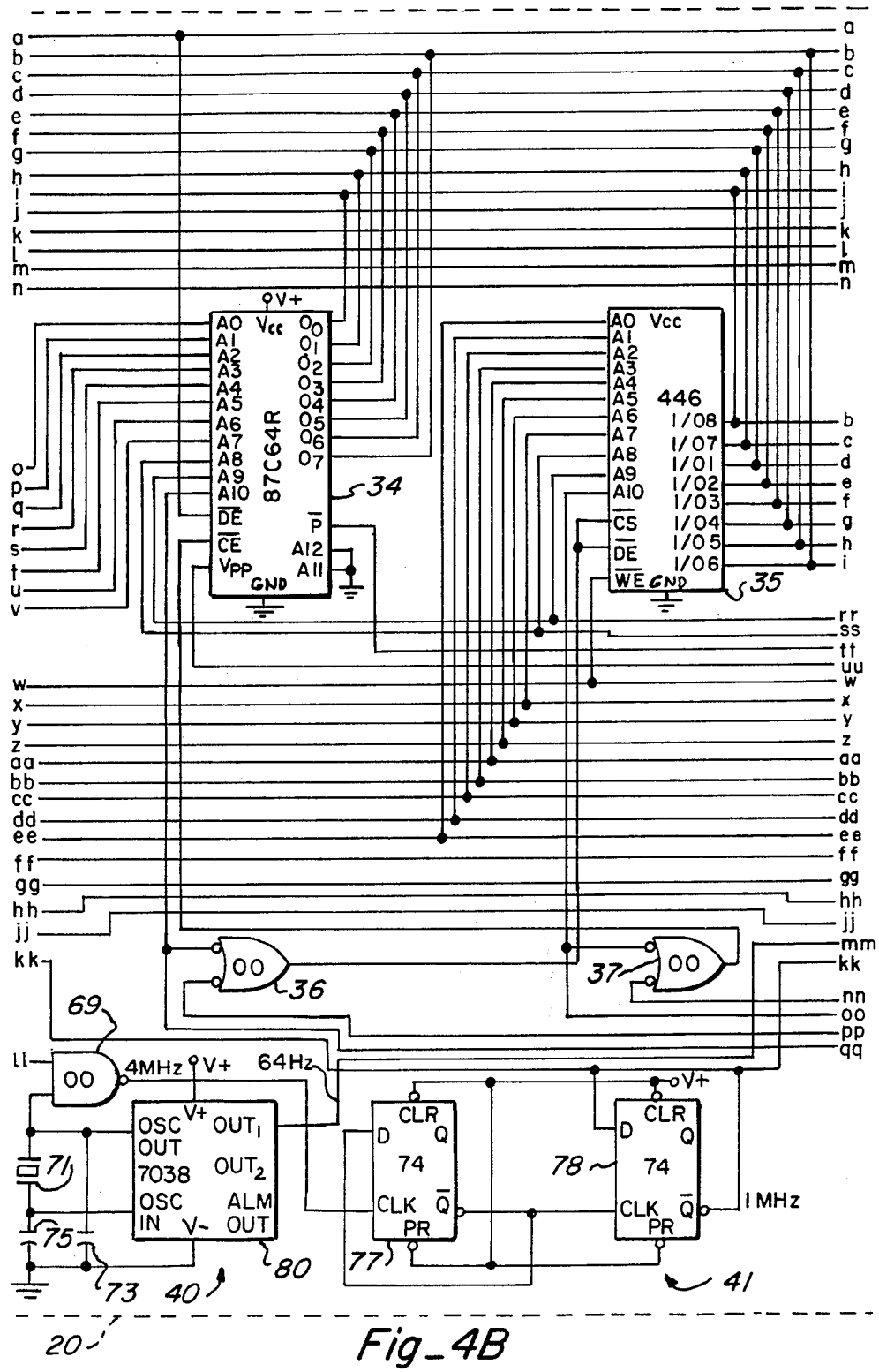
Fig_4B

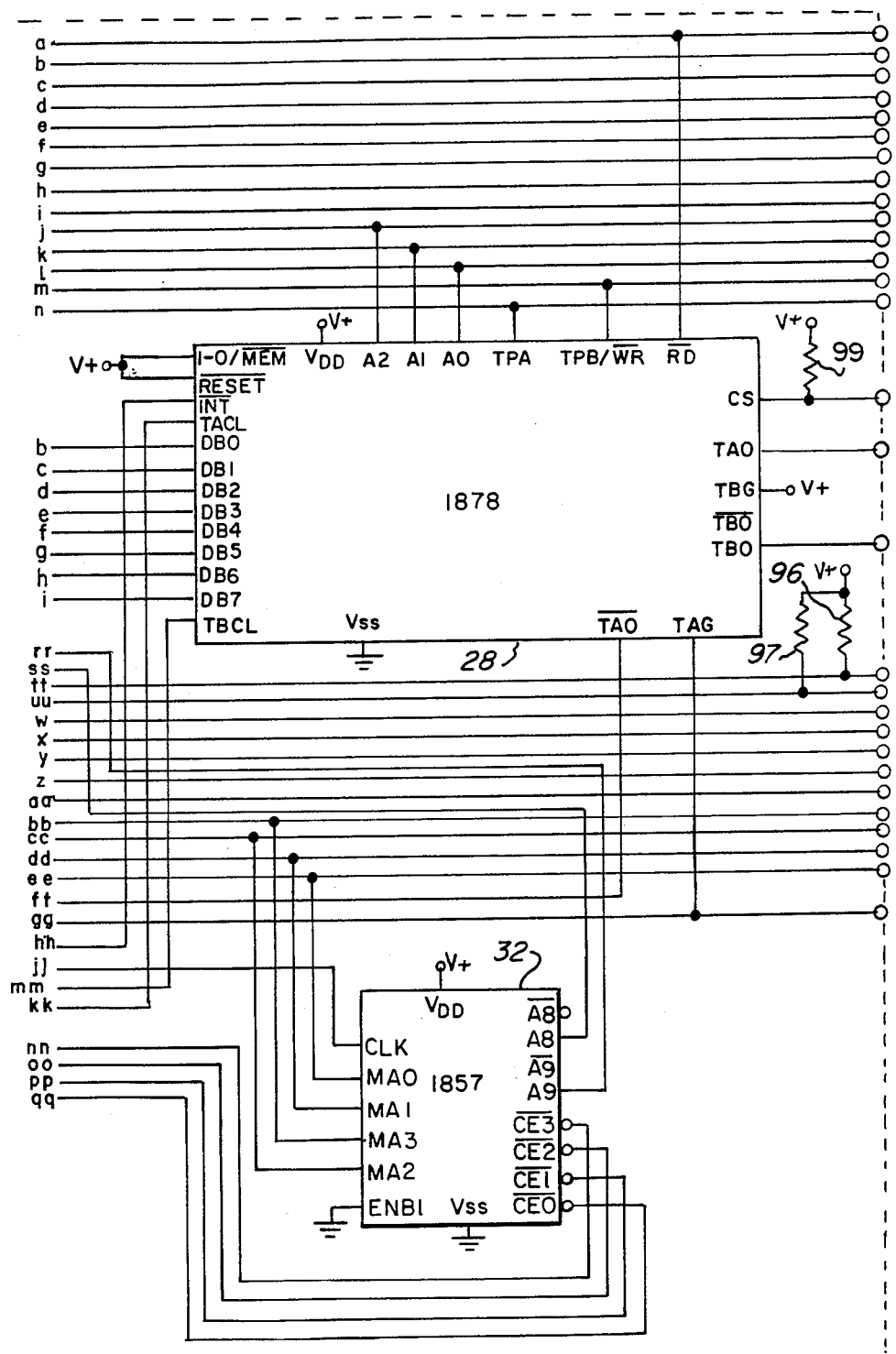
Fig_4C

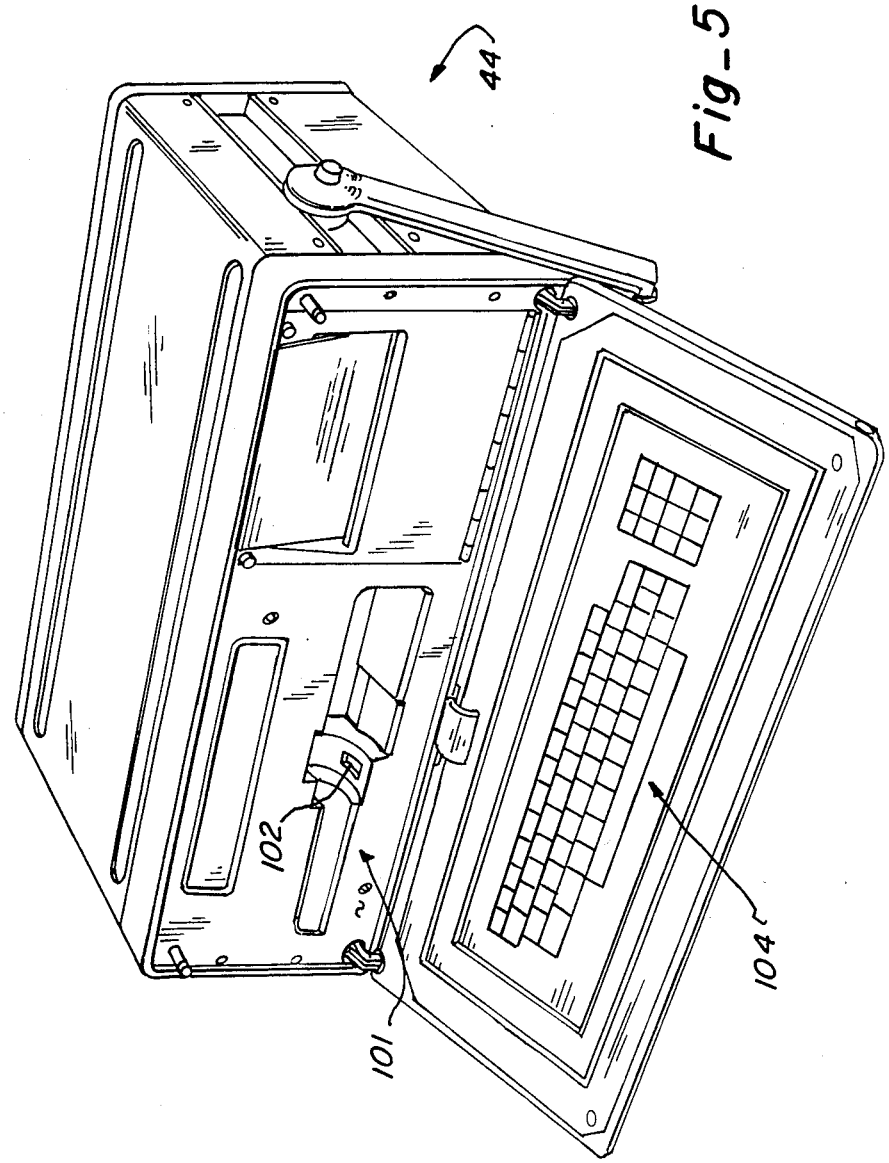

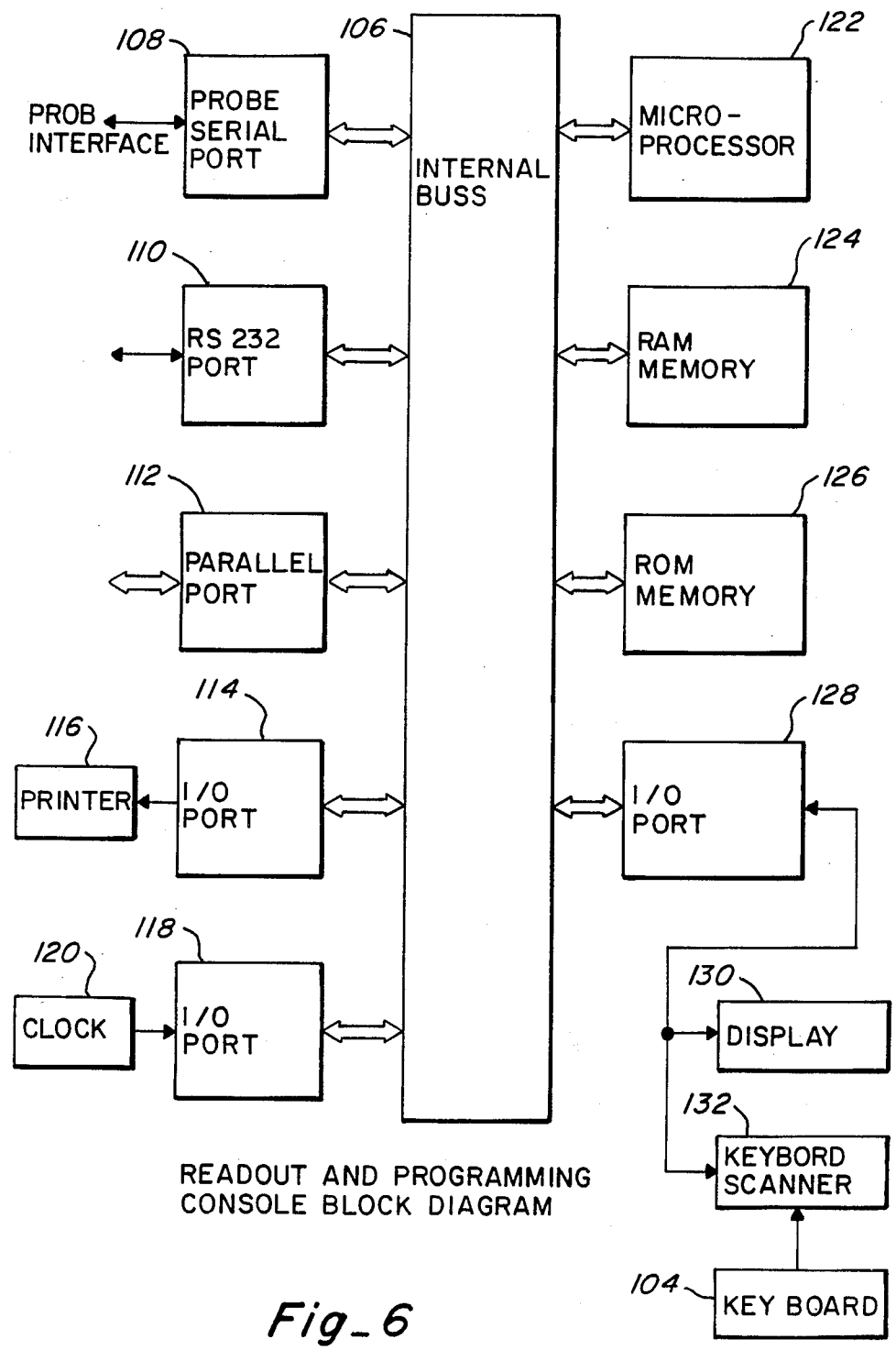
READOUT AND PROGRAMMING
CONSOLE BLOCK DIAGRAM
Fig_6

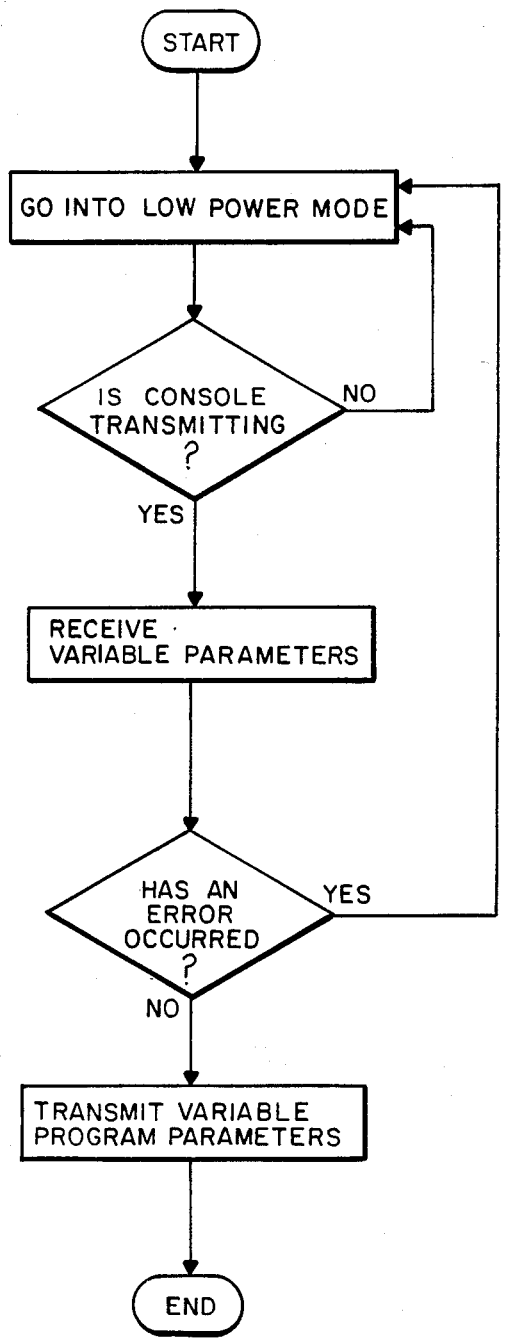
Fig_7

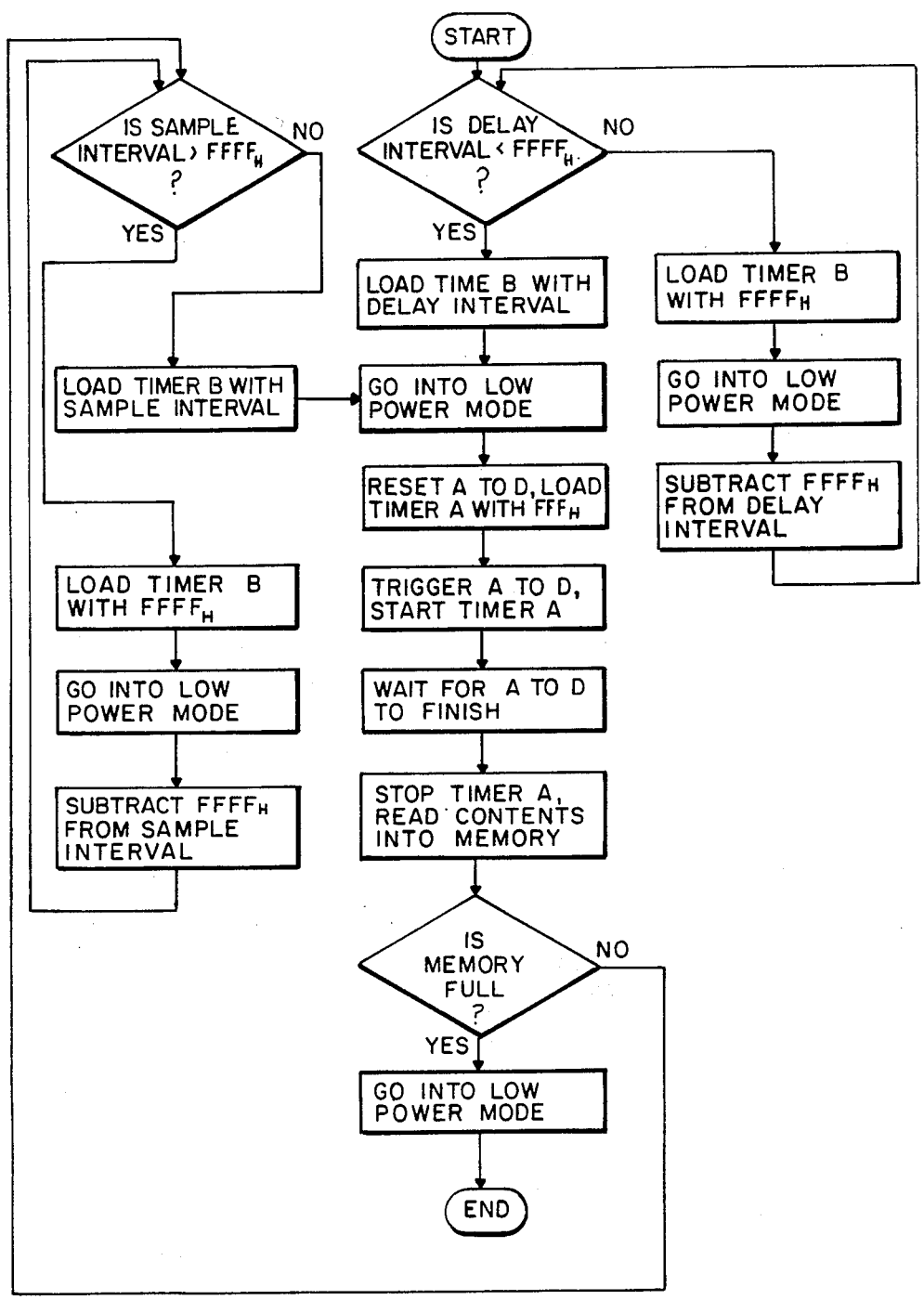
Fig_8

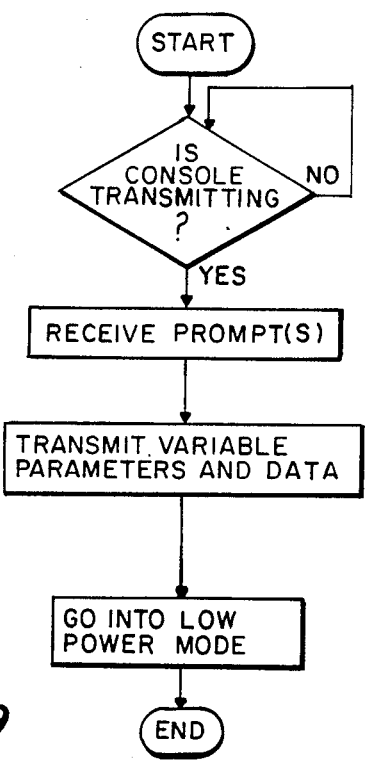
Fig_9
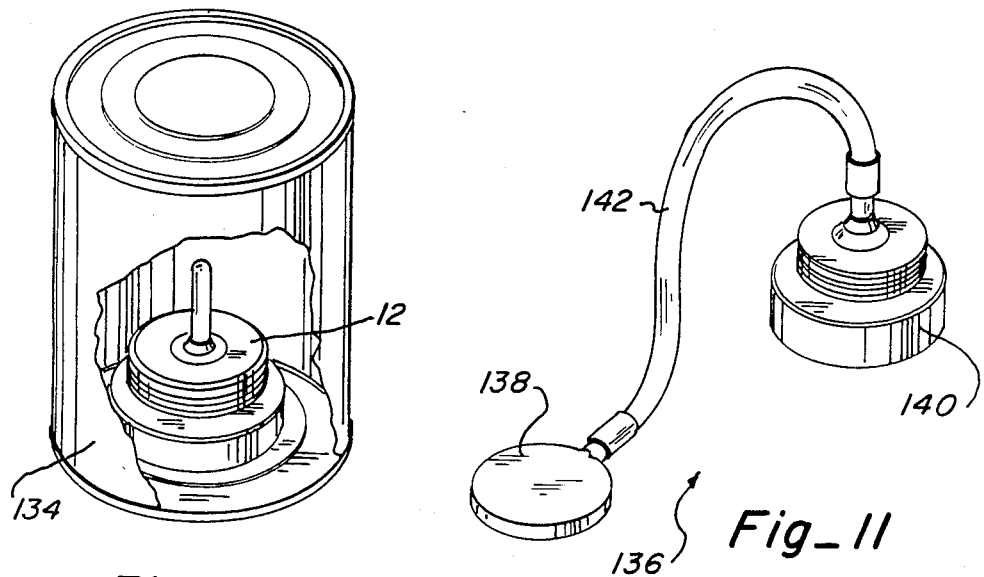
Fig_10
Fig_11

PORTABLE MONITORING DEVICE AND METHOD

RELATED APPLICATION

This application is a continuation of U.S. patent application Ser. No. 764,658, filed Aug. 12, 1985, entitled "Portable Monitoring Device And Method", and now abandoned.

FIELD OF THE INVENTION

This invention relates to a monitoring device and method, and, more particularly, relates to a portable monitoring device and method suitable for electrically monitoring a predetermined parameter while at a preselected monitoring area.

BACKGROUND OF THE INVENTION

Devices and methods for monitoring of various conditions, or parameters, are well known, and include, for example, devices and methods for monitoring temperature, pressure, pH, strain, acceleration, radiation, conductivity and the like.

Monitoring, or measuring, devices for measuring temperature, for example, have ranged from relatively simple devices, such as thermometers, to far more sophisticated and/or complex devices, such as electronically operated temperature sensors and recorders.

Known parameter measuring devices have heretofore included, for example, electronic circuitry such as analog-to-digital converters for converting analog signals to digital signals and circuitry for processing digital signals and storing such signals in memory units, such as random access or read only memory units (see, for example, U.S. Pat. Nos. 4,109,527 and 4,324,138). In addition, such known devices have also included a microprocessor for controlling operation of the device (see, for example, U.S. Pat. Nos. 4,234,927 and 4,324,138).

Temperature monitoring devices have also heretofore been known and/or suggested which include temperature sensors capable of being transported through a monitoring area, such as an oven, in order to monitor the temperature within the oven with the sensed temperatures being recorded on a recorder positioned outside the oven (see, for example, U.S. Pat. No. 2,696,115).

Thus, while monitoring devices and methods have been heretofore known and/or utilized for diverse purposes, improvements in such devices and methods are still thought to be needed to provide better probes capable of utilization at a monitoring area with the information gained being thereafter readily recoverable from the probe.

SUMMARY OF THE INVENTION

This invention provides an improved monitoring device and method that is miniaturized and is particularly well suited for operation at a monitoring area as a self-sufficient and electronically isolated unit, with information stored in the probe, while at the monitoring area, being readily recoverable after the probe has been removed from the monitoring area.

It is therefore an object of this invention to provide an improved monitoring device and method.

It is another object of this invention to provide an improved monitoring device and method for sensing and storing information while at a monitoring area with the stored information being thereafter readily recoverable.

It is another object of the invention to provide an improved monitoring device that is miniaturized.

It is still another object of this invention to provide an improved monitoring device that is a self-sufficient unit.

It is still another object of this invention to provide an improved monitoring device that is electrically isolated while at the monitoring area.

It is still another object of this invention to provide an improved monitoring device that requires low power when in an active mode and achieve still lower power consumption when inactive.

It is still another object of this invention to provide an improved monitoring device and method that provides reliable information with respect to the parameter being monitored without requiring unduly elaborate or sophisticated electronic circuitry.

With these and other objects in view, which will become apparent to one skilled in the art as the description proceeds, this invention resides in the novel construction, combination, arrangement of parts and method substantially as hereinafter described and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 1 is a perspective view of the now preferred embodiment of the portable monitoring device, or probe, of this invention useful for measuring temperature;

FIG. 2 is a partially broken away side view of the probe shown in FIG. 1 illustrating the electronic circuitry within the probe housing;

FIG. 3 is an electronic block diagram of the monitoring device of this invention as shown in FIGS. 1 and 2;

FIGS. 4A, 4B, and 4C taken together, form an electronic schematic diagram of the monitoring device of this invention as shown in block form in FIG. 3;

FIG. 5 is a perspective view of a console unit useful for reading out information stored in memory in the probe shown in FIGS. 1 through 4;

FIG. 6 is a simplified electronic block diagram illustrating the console unit shown in FIG. 5;

FIGS. 7, 8, and 9 are logic flow charts illustrating typical operation of the monitoring device of this invention in the programming mode (with the probe connected with a console unit), measurement and storage mode (with the probe isolated and at a monitoring area), and in the readout mode (with the probe connected with the console unit);

FIG. 10 is a perspective view illustrating a typical use of the probe of this invention, as shown in FIGS. 1 through 4, within a container for monitoring temperature conditions of food within container when passing through an oven; and FIG. 11 is a perspective view of an alternative embodiment of the probe unit of this invention showing positioning of the sensor within a separate housing spaced from the main housing for the associated electronic circuitry of the probe unit.

DESCRIPTION OF THE INVENTION

The monitoring device, or probe, 12 of this invention is adapted for use at a monitoring area to sense a parameter thereat, with the information being then stored in memory until the probe is removed from the monitoring area.

The probe of this invention is particularly well suited for use in monitoring temperature to gain a temperature-time history (as is important, for example, for determining the extent of cooking that has occurred during food processing) or other temperature profiles (such as, for example, for determining the temperatures and times to which sensitive chemicals have been subjected during shipment or the like).

In addition, the probe of this invention is well suited for use in monitoring parameters other than temperature, including vibration/shock, pressure, strain, Ph, acceleration, conductivity and/or radiation through the use of sensors, or transducers, providing output signals indicative thereof. Thus, while specifically described herein in connection with temperature as the selected parameter to be monitored, this invention is not meant to be limited to sensing and/or monitoring only this parameter.

Monitoring device, or probe, 12, as shown in FIGS. 1 and 2, includes a housing 13 having first and second coaxially positioned cylindrical sections 14 and 15 connected with one another at annular protrusion 16. In addition, section 15 is connected with a coaxially positioned sensor containing cylinder, or tube, 17 at annular protrusion 18. Housing 13, when fully assembled, provides a sealed enclosure that is electrically conductive and is preferably formed of metal, such as stainless steel, so that, when assembled, the housing completely encases sensor 19 (in section 17) and associated electronic unit, or circuitry, 20 (in section 14) so that the probe is thereafter a self-sufficient device, which, as brought out more fully hereinafter, is electrically isolated when at the monitoring area for operation in the contemplated manner.

As best shown in FIGS. 1 and 2, section 15 of housing 13 also includes band 22, which band is also electrically conductive and is also preferably formed of metal, such as stainless steel. Band 22 is electrically insulated from the remainder of the housing by insulator 23, and band 22 enables ready readout of information stored in the probe after removal of the probe from the monitoring area as brought out more fully hereinafter.

While the dimensions of housing, or casing, 13 may vary, as needed for a particular application, it has been found that a relatively small miniaturized probe with a first cylindrical section 14 having a diameter of not more than about 1.375 inches and an axial length of not more than about 0.75 inches, a second cylindrical section 15 having a diameter of not more than about 0.98 inches and an axial length of not more than about 0.40 inches, and a third cylindrical section, or tube, 17 having a diameter of not more than about 0.38 inches and an axial length of up to not more than about 5 inches, can be utilized for sensing temperature within a range of between about $-40°$ C. and $+150°$ C. with a temperature accuracy of at least $\pm 0.1°$ C.

As shown in FIG. 2, sensor 19 is positioned in tubular cylindrical section 17 (preferably at the end thereof most removed from the other cylindrical sections) and is connected with the associated electronic circuitry 20 of the probe, which circuitry is positioned in the largest cylindrical section 14, through lead 24.

Sensor 19 and electrical circuitry 20 are shown in block form in FIG. 3 and are shown in greater detail in the schematic presentation of FIG. 4A–C. Sensor 19 is commonly an analog transducer that provides an analog output signal through lead 24 to analog-to-digital (A/D) converter 26 of electronic unit, or circuitry, 20 (if a digital transducer is utilized, then no A/D converter would be needed). Converter 26 converts received analog signals to digital output signals which are coupled to timer/counter unit 28 and to microprocessor unit 30.

Timer/converter unit 28 provides timing functions for the probe, while microprocessor unit 30 controls operation of the probe. For the probe of this invention, microprocessor unit 30 is preferably a CMOS micro (an RCA 1802 has been preferably used in a working embodiment of this invention). The microprocessor unit is therefore an 8-bit microprocessor (meaning the data path and internal organization are 8-bits wide).

As is conventional, however, the address bus of the microprocessor is 16-bits wide, allowing access to 65536 memory locations. In the device of this invention, the address and data bus are not multiplexed but instead, the high order (8-bits) and low order (8-bits) are multiplexed with the higher order being latched by the address decoder unit 32.

Microprocessor 30 has programmable read only memory (PROM) unit 34 (UVEPROM being utilized) and random access memory (RAM) unit 35 connected therewith with address decoder unit 32 being utilized for enabling the 8-bit to 16-bit circuit handling capabilities as needed.

Both the RAM and UVEPROM units utilized in this invention incorporate 2048×8 bytes. This is achieved by utilizing address decoder unit 32 (which is formed by RCA 1859). Four bits are latched—the two lowest and their inverses are passed to output pins while, as shown in FIG. 4C, the other two are decoded into four active low and mutually exclusive outputs ($\overline{CE0}$, $\overline{CE1}$, $\overline{CE2}$, and $\overline{CE3}$).

To decode and use the RAM and UVEPROM units, memory access lines (A10) are generated and a low chip enable ($\overline{CE}$) for each device is generated (this is accomplished from the decoder output on lines $\overline{CE0}$ and $\overline{CE2}$). To maintain the chip count low, two NAND GATES 36 and 37 are utilized in their DeMorgan equivalents to decode the chip enables (while this would appear to violate logic convention since the inputs of the RAM and UVEPROM are active low and the outputs of the equivalent gates are active high, this is not the case since the $\overline{CE}$ outputs are mutually exclusive meaning that one and only one of them may be low at any one time so that when the enable pin of the address decoder is pulled low, one of the $\overline{CE}$ outputs will always be low and by connecting this output to the NAND GATES the proper function is generated).

As also indicated in FIG. 3, mode control unit 39 is connected with timer/counter unit 28 and microprocessor 30 to control power application to the probe components with low power requirements being utilized throughout, and with power consumption being still further reduced when the probe is in an inactive, or sleep, mode during which no parameter sensing or storing of information in memory occurs.

A clock 40 is also provided, and clock inputs are provided therefrom to timer/counter unit 28 and through divide-by-four (÷4) unit 41 to timer/converter unit 28. As also indicated in FIG. 3, the probe is entirely powered by batteries 42 within the probe casing.

For use of the probe in sensing a parameter, the software programs that implement the probe operation are initially programmed into UVEPROM unit 34 prior to sealing the probe within housing 13. The additionally needed variable elements of probe software are loaded into RAM unit 35 by use of console unit 44 (shown in FIGS. 5 and 6) to establish the time and length of occurrence of sampling of the parameters.

When the probe is positioned at console unit 44, a bidirectional two wire master-slave protocol is implemented with error checking achieved by horizontal and vertical parity calculation (geometric error control). The console unit prompts the probe with serial encoded bit stream that contains, among other things, the delay time and sample rate selected by the user. The probe decodes this bit stream, checks it for errors and, if no error has occurred, stores the information in RAM unit 35 and re-transmits it to the console unit. A typical programming mode operation is shown in the logic flow chart of FIG. 7.

When a parameter reading, or sampling is to be made, mode control 39 causes electronic circuitry 20 to be activated from that of the standby, or sleep, mode. Sensor 19 then provides analog signals indicative of the sensed parameter to integrating A/D converter 26, which converter is an integrating converter, and which converter then provides a digital output signal, indicative of the received analog signal, to timer/counter unit 28, which also receives a clock input from clock unit 40. As a result, timer/counter 28, which includes countdown timers, starts a count which is terminated by the A/D converter depending upon the value of the sensed parameter. This count is then stored in RAM unit 35. A typical measurement and storage mode operation is shown in the logic flow chart of FIG. 8 (where FFFF$_H$ =65,535$_{10}$).

After removal of the probe from the monitoring area, the information stored in RAM unit 35 is readily read out through I/O lead 45 connected with band 22 accessible at the exterior of the probe housing. A typical readout mode operation is shown in the logic flow chart of FIG. 9.

A schematic diagram of the probe specifically adapted for temperature sensing, is best shown in FIG. 4A–C. As shown, a thermistor (utilized as sensor 19) is connected at one side to the B+ side of battery unit 42. The B+ side of battery unit 42 provides the positive voltage for the probe unit, with the B+ side being connected with ground through capacitor 46. Casing 13 is also tied to the B+ power source so that signals are referenced to the casing at a voltage of approximately −3.5 volts.

Under normal operating conditions at a monitoring area (and therefore not attached to the console unit), the I/O pin will be at the same potential as the case thereby creating no short circuit problems while the probe is at the a monitoring area.

The other side of thermistor 19 is connected through lead 24 to the first input of comparator 47 of A/D converter unit 26 of electronic unit 20. Lead 24 is also connected with a first side of parallel connected capacitors 49, 50 and 51, which capacitors form an integrating capacitor. The second input of comparator 47 is connected with the center tap of resistor 53, which resistor is connected at one side to the B+power supply (i.e., the positive side of battery unit 42) and at the other side to the second side of capacitors 49 through 51. The output of comparator 47 is connected to the second, or reference, input of the comparator through series connected capacitor 55 and resistor 56, and to the B+power supply through resistor 58.

Transistors 60 and 61 serve as switches for integrating A/D converter 26, with the bases of transistors 60 and 61 being connected with mode control unit 39 through resistors 63 and 64, respectively, and with the collector of transistor 61 being connected with capacitors 49 though 51 and with the first input of comparator 47.

Mode control unit 39 includes a pair of flip-flops 66 and 67, with flip-flop 66 serving as a reset flip-flop and flip-flop 67 serving as a sleep mode flip-flop. As shown, reset flip-flop 66 receives a clock input from the NO output of microprocessor 30 to be set thereby to provide a $\overline{Q}$ output, and sleep flip-flop 67 receives a clock input from the $\overline{TAO}$ output of the conversion timer section of timer/counter unit 28.

The $\overline{Q}$ output from reset flip-flop 66 is coupled to the base of transistor 61 of A/D converter unit 26, while the $\overline{Q}$ output of flip-flop 67 is couple to the base of transistor 60 and also provides an input to NAND gate 69 of clock unit 40.

Analog-to-digital converter 26 allows sensing over a wide temperature range with low power consumption requirements, and yet provides 11-bit resolution (but could be expanded to 16-bit resolution). A/D converter 26 is a single slope integrating converter (as opposed to the more commonly used techniques of dual and triple slope integrating conversion).

Operation of A/D circuit 26 is relatively simple. The circuit is turned on by an input signal to transistor 60 (from flip-flop 67), which input signal also gates the system clock on (it was necessary to turn off the A/D circuit during the sleep mode to lower power consumption requirements). The integrating capacitor (made up of capacitors 49, 50 and 51) is discharged under program control by transistor 61, and the microprocessor initializes the conversion counter (the A counter of timer/counter unit 28) during this time.

Transistor 61 is then turned off and the conversion counter is started simultaneously by the microprocessor unit. The microprocessor unit samples the $\overline{EF2}$ output (output of comparator 47) periodically, and when the voltage on the capacitor equals the reference voltage (as set by resistor 53), the $\overline{EF2}$ output goes low. This signals the microprocessor that the conversion is complete and the conversion counter is stopped.

The microprocessor unit then reads out the value of the conversion from timer/counter unit 28 and causes the information to be coupled to RAM unit 35 for storage and later recall. The microprocessor then causes the probe to again return to the sleep mode.

Clock unit 40 includes an oscillator 71 (4.138 MHz) connected at one side with the second input of NAND GATE 69 and through capacitor 73 with ground. The other side of oscillator 71 is connected with ground through capacitor 75. NAND gate 69 provides a 1 MHz output to divide-by-four (÷4) unit 41 (consisting of flip-flops 77 and 78). The Q output of flip-flop 78 of divider unit 41 provides a 1 MHz output to timer/counter unit 28 to initiate start of a sleep cycle.

Oscillator 71 is also connected at the opposite sides thereof with divider unit 80 which provides a 64 Hz output signal for effectively requiring even lower power consumption to timer/counter unit 28 when the probe is in the sleep mode.

The clock system utilized allows the average power requirements to be lowered to approximately 540 microwatts. This is accomplished by gating the 4 MHz clock off to all devices that use the high speed clock except when powered up for measuring a parameter and storing the same.

The MA 0-7 connections of microprocessor unit 30 are connected with the A 0-7 connections of ultraviolet erasable programmable read only memory (UVEPROM) unit 34 and random access memory (RAM) unit 35. In addition, the BUS 0-7 connections of microprocessor unit 30 are connected with connections 0 0-7 of UVEPROM unit 34 and connection I/O 1-8 (which are also connected with connections DB 0-7 of timer/counter unit 28), the $\overline{MRD}$ connection of microprocessor unit 30 is connected with the $\overline{DE}$ connection of UVEPROM unit 34 and the RD connection of timer/counter unit 28, the N0 connection of microprocessor unit 30 is connected to provide the clock input to reset flip-flop 66 and the A0 input to timer/counter unit 28, the N1 connection of microprocessor unit 30 is connected with the A1 connection of timer/counter unit 28, the N2 connection of microprocessor unit 30 is connected with the $\overline{S}$ connection of reset flip-flop 66 and to the A2 connection of timer/counter unit 28, the TPB connection of microprocessor unit 30 is connected with the TPB/WR connection of timer/counter unit 28, the TPA connection of microprocessor unit 30 is connected with the clock connection of address (or latch) decoder unit 32 and the TPA connection of timer/counter unit 28, the $\overline{MWR}$ connection of microprocessor unit 30 is connected with the $\overline{WE}$ connection of RAM unit 35, the Q input of microprocessor unit 30 is connected with I/O lead 45 through resistor 82 and with the B+ power supply through resistor 84, I/O lead 45 is connected with the $\overline{EF1}$ and $\overline{INTRPT}$ connection of microprocessor unit 30 and one input of NAND gate 86 (the output of which is connected with the $\overline{S}$ input of sleep flip-flop 67, the $\overline{WAIT}$ connection of microprocessor unit 30 is connected to the B+ power supply through resistor 88, the CLR connection of microprocessor unit 30 is connected with the B+ power supply through resistor 90 and is connected with ground through capacitor 92, and the $\overline{DMA\ OUT}$ and $\overline{DMA\ IN}$ connections of microprocessor unit 30 are connected with the B+ power supply through resistors 93 and 94, respectively.

The $\overline{P}$ and Vpp connections of UVEPROM unit 34 are connected with the B+ power supply through resistors 96 and 97, respectively, the A8 and A9 connections of UVEPROM unit 34 are connected with the A8 and A9 connections, respectively, of RAM unit 35 and address (or latch) decoder unit 32, the A10 connection of UVEPROM unit 34 is connected with the $\overline{CE0}$ output of latch/decoder unit 32 and one input of NAND gate 36 (the other input of which gate is connected with the $\overline{CE1}$ output of latch/decoder unit 32 and the output of which gate is connected to the $\overline{CS}$ and $\overline{DE}$ inputs of RAM unit 35, the A10 connection of RAM unit 35 is connected with the $\overline{CE2}$ output of latch/decoder unit 32 and one input of NAND gate 37 (the other input of which is connected with the $\overline{CE3}$ output of latch/decoder unit 32 and the output of which is connected to the ,ovs/CE/ input of UVEPROM unit 34), and the CS connection of counter/timer unit 28 is connected with the B+ power supply through resistor 99.

The probe of this invention satisfies a need for a monitoring device that is battery operated with very low power consumption, including a relatively large storage memory, can be serially read out by means of a single wire (plus a case ground wire), is relatively simple in structure with a minimum of chips being utilized, is operational over a temperature range of about −40° C. to +150° C. with an accuracy of at least 0.1° C., is able to make 11+ bit resolution measurements, and is adaptable for sensing a plurality of different parameters.

To enter the sleep mode, the sleep timer (the B counter of timer/counter unit 28) must be loaded with appropriate values, including the control word. Then a jam A counter control is issued causing the TAO line to toggle which clocks a low into sleep flip-flop 67 to gate the 4 MHz clock output (from gate 69) off.

Power-up from the sleep mode occurs when either the sleep timer (B counter of timer/counter unit 28) times out resulting in a low applied on the $\overline{INT}$ output of timer/counter unit 28, or the I/O line 45 is driven to approximately −3.5 volts with respect to the case (which indicates that the probe is in communication with the console unit). The sleep timer is never gated off, but instead receives an input from clock unit 40, which input is a divide by 223 output of the 4 MHz resulting in a 64 Hz clock.

In typical operation, the probe is positioned at console unit 44 so that console unit 44 initiates default values in the RAM unit, loads up the sleep timer, and then assumes the sleep mode.

The probe is thereafter placed in use and inserted into the monitoring area (such as an oven, for example, where temperature is being sensed by a temperature sensing probe). The low power consumption (sleep) mode is maintained until a timer B timeout occurs to cause the probe to go into the active mode during which parameter sensing and information storage is achieved. After sensing and information storage have been accomplished, the probe again returns to the sleep mode.

Console unit 44, as shown in FIG. 5, a general purpose computer modified for probe usage, is provided to read out the information stored in the probe after removal of the probe from the monitoring area. As shown, console unit 44 includes a receiving portion 101 for receiving the probe so that contact 102 contacts band 22 on the probe. This allows readout of the information stored in the RAM unit of the probe.

Communication with the probe is achieved via a master-slave telemetry-type protocol where the console is the master and the probe is the slave. The console always initiates communication and the probe responds accordingly to the command issued to it. As shown in FIG. 5, a keyboard 104 is typically provided for the console unit, which console may be conventional except for design necessary for positioning and maintaining the probe in position for communication of the probe with the console.

A simplified block diagram of the console unit is shown in FIG. 6. As shown, an internal buss 106 is utilized, with the probe interface being provided through probe serial port 108 (connected with contact 102). In addition, internal buss 106 of console 104 is also connected with RS232 port 110 (a general purpose computer port to allow communication with another computer), parallel port 112 (for optional connection with a calibration device), I/O port 114 leading to printer 116, I/O port 118 leading to clock 120, microprocessor 122, RAM memory 124, ROM memory 126 and I/O port 128 leading to a display 130, and a keyboard scanner 132 (connected with keyboard 104).

In operation, probe 12 is programmed for the particular use desired, and then inserted into the monitoring area. This can be accomplished, for example, by transporting the temperature probe through an oven (or, in the alternative, leaving the probe within the oven for a period of time). As indicated in FIG. 10, probe 12 may also be placed within a container 134, such as a food container, to monitor the actual conditions of food within the container during processing of the food.

An alternate embodiment 136 of the probe is shown in FIG. 11. As shown, sensor 138 is outside container 140 housing the electronic circuitry and is connected therewith through electric connector 142. This embodiment can be used to good advantage, for example, where the sensor must be positioned at a location not readily accessible to the remainder of the electronic circuitry.

As can be appreciated from the foregoing, this invention provides an improved device and method for sensing a parameter at a monitored area and storing information indicative thereof, which stored information is then later readily available after removal of the probe from the monitored area.

What is claimed is:

1. A miniaturized monitoring device capable of being positioned at a preselected monitoring area, including small and relatively otherwise inaccessible monitoring areas, with said device being electrically isolated when at said monitoring area, said device comprising:

housing means providing a sealed compartment of compact size suitable for positioning at said monitoring area;

sensing means within said sealed compartment of said housing means for sensing a predetermined parameter at said monitoring area and providing electrical output signals indicative thereof;

signal processing means within said sealed compartment of said housing means, said signal processing means including digital storage means connected with said sensing means for storing in digital form electrical output signals received from said sensing means, and control means including microprocessor means for automatically controlling operation of said sensing means and said storage means so that output signals are caused to be periodically produced by said sensing means at predetermined times as programmed into said microprocessor means and stored at said storage means when said housing means is at said monitoring area;

power means within said sealed compartment of said housing means for totally powering said signal processing means; and signal transfer enabling means at said housing means and accessible outside said sealed compartment for enabling at least preselected programming of said microprocessor means and for enabling transfer of electrical signals stored at said storage means when said monitoring device is positioned at a console unit remote from said monitoring area, with said monitoring device being operationally independent of said console unit while said monitoring device is at said monitoring area.

2. The device of claim 1 wherein said monitoring device is a miniaturized probe, and wherein said housing means includes a first cylindrical portion with a diameter no greater than about 1.375 inches and an axial length no greater than about 0.75 inches for receiving said signal processing means and a second cylindrical portion smaller in diameter than said first cylindrical portion for receiving said sensing means.

3. The device of claim 2 wherein said first and second cylindrical portions are coaxially positioned with respect to one another and maintain said sensing means and said signal processing means spaced from one another within said housing means.

4. The device of claim 1 wherein said device includes first housing means for receiving said sensing means, second housing means for receiving said signal processing means, and electrical connecting means extending between said first and second housing means for connecting said sensing means with said signal processing means.

5. The device of claim 1 wherein said sensing means is a temperature sensor and wherein said housing means is adapted to be positioned at a monitoring area to be temperature monitored.

6. The device of claim 5 wherein said device is capable of sensing and storing temperature information within a range of about $-40°$ C. to $150°$ C. at an accuracy of at least $0.1°$ C.

7. The device of claim 5 wherein said device is received in a container so as to be completely immersible in food then being processed at said monitoring area.

8. The device of claim 1 wherein said sensing means provides output electrical signals in analog form, wherein said storage means includes digital signal memory means, and wherein said signals processing means also includes analog-to-digital converter means connected between said sensing means and said memory means.

9. The device of claim 1 wherein said control means controls operation of said device so that said device has an average power requirement no greater than about 540 microwatts.

10. The device of claim 1 wherein said device includes mode control means for causing operation of said device in a first mode that requires low power when sensing and storing signals, and in a second mode when not sensing or storing signals with operation in said second mode requiring power but causing less power consumption than does operation in said first mode.

11. The device of claim 1 wherein said signal transfer enabling means includes electrical contact means accessible at the exterior of said housing means for enabling said preselected programming of said microprocessor means and for enabling serial transfer of electrical signals from said storage means to said console unit.

12. The device of claim 11 wherein said housing is electrically conductive, and wherein said electrical contact means is an electrically conductive band that is electrically insulated from said housing means to enable signals to be transferred from said device.

13. The device of claim 1 wherein said power means includes battery means within said sealed compartment of housing means for totally powering said device.

14. A miniaturized probe for monitoring a predetermined parameter when at a preselected monitoring area, including small and relatively otherwise inaccessible monitoring areas, said probe comprising:

an electrically conductive housing having first and second portions, said housing being of compact size suitable for positioning at said preselected monitoring area with said probe being electrically isolated when at said monitoring area;

sensing means at said first portion of said housing, said sensing means being capable of sensing said predetermined parameter at said monitoring area and providing analog output signals indicative thereof;

signal processing means at said second portion of said housing, said signal processing means including analog-to-digital converter means connected with said sensing means to receive said analog signals therefrom and responsive thereto providing digital output signals, memory means connected with said analog-to-digital converter means to receive and store in digital form digital output signals received from said analog-to-digital converter means, and microprocessor means connected with said analog-to-digital converter means and said memory means for controlling signal transfer through said analog-to-digital converter means and storage of said digital signals at said memory means with transfer and storage occurring at predetermined times as programmed into said microprocessor means;

battery means at said second portion of said housing for totally powering said signal processing means; and electrical contact means accessible at the exterior of said housing, said electrical contact means being electrically insulated from said housing means and connected with said microprocessor means and said memory means whereby at least preselected programming of said microprocessor means is enabled prior to monitoring of said parameter at said monitoring area and whereby information at said memory means can be transferred from said probe after removal of said probe from said monitoring area.

15. The probe of claim 14 wherein said housing includes a third portion, wherein said first, second and third portions of said housing are cylindrical and coaxially positioned with respect to one another with said third portion being between said first and second portions, and wherein said electrical contact means is a band on said third portion of said housing engageable by an electrical contact portion of a console unit when said probe is received at said console unit for said programming of said microprocessor means and for said memory means readout purposes.

16. The probe of claim 14 wherein said sensing means is a temperature sensor, and wherein said probe is capable of being transported through a monitoring area having a higher-than-ambient temperatures.

17. A miniaturized monitoring device, comprising:
housing means providing first and second sealed compartments of compact size for enabling positioning of said monitoring device at a monitoring area;
sensing means within said first sealed compartment for sensing a predetermined parameter at said monitoring area and providing electrical output signals indicative thereof;
signal processing means within said second sealed compartment and including memory means connected with said sensing means to receive said electrical output signals therefrom and store the same, and control means including microprocessor means for controlling the storage of said electrical signals at said memory means at predetermined times as programmed into said microprocessor means with said control means causing said monitoring device to be powered at a first level when receiving and storing said signals at said memory means and powered at a second level lower than said first level when said monitoring device is not receiving or storing said electrical signals from said sensing means; and
battery means for totally powering said signal processing means at said first and second levels at least while said device is at said monitoring area.

18. The device of claim 17 wherein said sensing means is a temperature sensor for sensing temperatures at said monitoring area with said sensing and storage of temperature information within a range of about $-40°$ C. to $150°$ C. being at an accuracy of at least $0.1°$ C.

19. A method for monitoring a predetermined parameter at a preselected monitoring area, said method comprising:
providing a sensor and storage means;
encasing said sensor and storage means within a miniaturized and sealed probe having a microprocessor therein and power means for totally powering the probe;
programming the microprocessor at least with respect to time and extent of desired sensing of a predetermined parameter;
passing said probe through the area to be monitored after said microprocessor has been programmed;
periodically sensing said predetermined parameter at said area to be monitored as selected by said programmed microprocessor and automatically storing the same in digital form at said storage means within the probe;
removing the probe from the monitoring area; and
reading out the digital information stored at said storage means after removal of the probe from the monitored area.

20. The method of claim 19 wherein said method includes providing analog signals as a result of sensing said parameter at said monitoring area and converting said analog signals to digital signals for storing said digital signals at said storage means within said probe.

21. The method of claim 19 wherein said method includes sensing temperatures at said monitored area and reading out signals indicative of said sensed temperatures after removal of said probe from said monitoring area, said sensing and storage of temperature information within a range of about $-40°$ C. to $150°$ C. being at an accuracy of at least $0.1°$ C.

22. The method of claim 19 wherein said method includes providing an electrical contact accessible at the exterior of said probe, and utilizing a read-in device making contact with said electrical contact on said probe to program at least selected portions of said microprocessor prior to passing said probe through said monitoring area and a read-out device making electrical contact with said electrical contact on said probe after removal of the probe from the monitored area in order to serially read out said information stored at said storage means within the probe.

23. The method of claim 19 wherein said method includes powering said probe at a first low power consumption level while said information is being transferred to said storage means and powering said probe at a second low power consumption level than is lower than said first low power consumption level when information is not being transferred to said storage means.

* * * * *